United States Patent
Ohl

(10) Patent No.: US 8,855,216 B2
(45) Date of Patent: Oct. 7, 2014

(54) METHOD FOR SUPPLYING AT LEAST ONE BUS USER

(75) Inventor: Christian Ohl, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/583,552

(22) PCT Filed: Mar. 1, 2011

(86) PCT No.: PCT/EP2011/052966
§ 371 (c)(1),
(2), (4) Date: Nov. 16, 2012

(87) PCT Pub. No.: WO2011/110442
PCT Pub. Date: Sep. 15, 2011

(65) Prior Publication Data
US 2013/0070863 A1   Mar. 21, 2013

(30) Foreign Application Priority Data
Mar. 9, 2010 (DE) .......................... 10 2010 002 679

(51) Int. Cl.
H04L 25/00 (2006.01)
H04B 3/00 (2006.01)
H04B 3/54 (2006.01)
H04L 12/10 (2006.01)
H04L 12/40 (2006.01)

(52) U.S. Cl.
CPC ................ *H04B 3/542* (2013.01); *H04L 12/10* (2013.01); *H04L 12/40045* (2013.01)
USPC .......................................... 375/257; 375/258

(58) Field of Classification Search
USPC ................................... 375/257, 258
See application file for complete search history.

(56) References Cited

U.S. PATENT DOCUMENTS

| 6,097,761 | A | 8/2000 | Buhring et al. | |
|---|---|---|---|---|
| 6,459,363 | B1 | 10/2002 | Walker et al. | |
| 2004/0213289 | A1 * | 10/2004 | Liu et al. | 370/469 |
| 2007/0086686 | A1 | 4/2007 | Ishikawa et al. | |
| 2007/0233920 | A1 | 10/2007 | Misawa et al. | |
| 2009/0210171 | A1 * | 8/2009 | Fu | 702/35 |
| 2010/0017641 | A1 * | 1/2010 | Misawa et al. | 713/503 |
| 2010/0123701 | A1 * | 5/2010 | Yeo | 345/211 |

FOREIGN PATENT DOCUMENTS

| CN | 1355903 | 6/2002 | |
|---|---|---|---|
| DE | 19904878 A1 * | 8/2000 | H04L 12/10 |
| EP | 0 322 897 | 7/1989 | |
| EP | 0 822 684 | 2/1998 | |
| EP | 0822684 | 2/1998 | |
| GB | 1 598 553 | 9/1981 | |

* cited by examiner

*Primary Examiner* — Chieh M Fan
*Assistant Examiner* — Brian J Stevens
(74) *Attorney, Agent, or Firm* — Kenyon & Kenyon LLP

(57) ABSTRACT

A method for supplying at least one bus user via a control unit, in which data are transmitted to at least one bus user during at least one phase for data transmission and power is transmitted during at least one phase for power transmission, the at least one phase for data transmission and the at least one phase for power transmission being provided alternately, and the lengths of the phases for data transmission and/or the lengths of the phases for power transmission being set variably.

21 Claims, 1 Drawing Sheet

METHOD FOR SUPPLYING AT LEAST ONE BUS USER

FIELD OF THE INVENTION

The present invention relates to a method for supplying at least one bus user and a system for supplying at least one bus user.

BACKGROUND INFORMATION

In a system which has a master, e.g., a control unit, and a number of slaves, such as consumers, which are connected to the master, information is exchanged between the master and the slaves. Furthermore, the master may also provide power to the slaves. Deliberations are made in this case in order to provide a possibility for transmitting power and information between the master and the slaves.

Electrical interfaces for connecting at least one sensor to a control unit are known, both the power supply and also the data transmission occurring via only two lines. The power is transmitted via a comparatively constant bias current, e.g., via a peripheral sensor interface (PSI5). Alternatively, cyclic power transmission may be carried out, e.g., between or during the transmission of individual bits, for example, in the case of a safe-by-wire operation, which was defined by leading automobile manufacturers and suppliers, or according to an ISO standard. The power transmission may also take place between one or more data words, for example, via a dynamic interface (distributed sensor interface, DSI), or other suitable interfaces, as are offered by Freescale or TRW, inter alia. The cyclic supply has the characteristic that the power is buffered in the sensors for the phases between the power supply. The power transmission takes place frequently in phases having higher voltages and/or according to a fixed time pattern.

Overall, only small power outputs in the range of several watts or currents of at most a few hundred milliamperes have been able to be transmitted using the previous methods.

U.S. Pat. No. 6,459,363 indicates that two wires, via which a control unit and a module are connected to one another, are used to transmit data and power.

A procedure and a system for transmitting power and data via the same line, to which a number of stations are connected, are discussed in U.S. Pat. No. 6,097,761. For this purpose, it is proposed that a bipolar AC voltage be fed into the line, in which a first polarity is only used for the power supply and the data transmission takes place only by amplitude modulation of the pulses of a second polarity. If the pulses of the first polarity are fed in at very low resistance, a large quantity of power may be transmitted to the stations. Only a low power is necessary for the modulation of the data transmission if the pulses of the second polarity are fed in at a high resistance. In this way, only two conductors are necessary, one of which may be replaced by the ground of the system in the simplest case. If three conductors are used, an increased fault safety against the failure of one conductor may be achieved in a very simple way.

A communication system having a master and a number of slaves, which are connected to one another via a bus, is the subject matter of U.S. Patent Publication No. 2007/086,686. In this case, charging times, in which a voltage is applied to the bus, and discharging times, in which the voltage drops again, are alternated according to a fixed predefined pattern. Data are always transmitted when the voltage reaches the value zero during a discharging time.

A similar communication system is discussed in U.S. Patent Publication No. 2007/233920. Time intervals for transmitting power and for transmitting data alternate therein. It is provided that the lengths of the time intervals are fixedly predefined, and a data rate of the transmitted data may be varied.

SUMMARY OF THE INVENTION

Against this background, a method and a system having the features described herein are presented. Further embodiments of the present invention result from the further description herein.

A bus or a network is provided, which may include a pair of lines, typically two wires, and via which power transmission and data transmission take place. This may be a bus for at least one bus user and/or consumer, for example, a sensor bus, having only two electrical lines, which is configured in such a way that large currents may also be transmitted to provide electrical power to the bus user, and therefore it is possible to connect consumers having a higher power demand and/or a higher power consumption, for example, actuators and/or sensors.

Therefore, separate cables for power and data transmission, which are otherwise required, may be dispensed with, whereby weight and material may be saved. Furthermore, plug pins may be dispensed with on the control unit and also on the sensors, whereby the overall size may be reduced and therefore further costs may be saved. The data rate during a variably settable phase for data transmission and the amount of power used during a variably settable phase for power transmission may be flexibly adapted to the needs of the particular connected bus user. If needed, the adaptation may also typically take place dynamically during the runtime. The use of costly energy storages, such as capacitors, for example, in sensors, and/or actuators as possible bus users which may be configured as electrical assemblies, may be dispensed with.

A control unit may have a dynamic interface, e.g., a DSI (distributed sensor interface), via which the two lines of the bus are connected to the bus user. Using this dynamic interface, it is possible in one design to switch back and forth between the phases for power transmission and the phases for data transmission. Through this measure, flexible and/or intelligent decoupling of successive phases for power transmission and data transmission may take place. Depending on the design, the mentioned phases may succeed one another directly. However, it is also possible that a pause, for example, a switchover pause, is provided between the phases.

In one design, power and data are provided to the at least one bus user by the control unit, which are connected to one another, during at least one phase, which is provided for power transmission, and at least one phase, which is provided for data transmission, which alternate with one another and each follow one another. In one specific embodiment, during phases for data transmission, power may also be provided, typically in a smaller quantity and/or at lower output, than during the phases for power transmission. In addition, a length or duration of the alternating phases for power and/or data transmission may be adapted to demand and/or as a function of operating parameters of the at least one bus user. It is additionally possible to vary the transmission rate of the data during a phase for data transmission and/or successive phases to carry this out.

One possible use of the exemplary embodiments and/or exemplary methods of the present invention is provided for sensors having an increased power demand and sensor/actuator combinations, e.g., a lambda sensor, an air flow meter, a $CO_2$ or $NO_x$ sensor, a final control element and/or encoder of a throttle valve, as the bus user, and therefore consumers, typically in a motor vehicle.

The system according to the present invention is configured for the purpose of carrying out all steps of the presented method. Individual steps of this method may also be carried out by individual components of the system. Furthermore, functions of the system or functions of individual components of the system may be implemented as steps of the method. In addition, it is possible that steps of the method are implemented as functions of at least one component of the system or of the entire system.

Further advantages and embodiments of the present invention result from the description and the appended drawings.

The above-mentioned features and the features to be explained hereafter are usable not only in the particular specified combination but rather also in other combinations or alone, without leaving the scope of the present invention.

Further advantages and embodiments of the present invention result from the description and the appended drawings.

DETAILED DESCRIPTION

Figure 1:
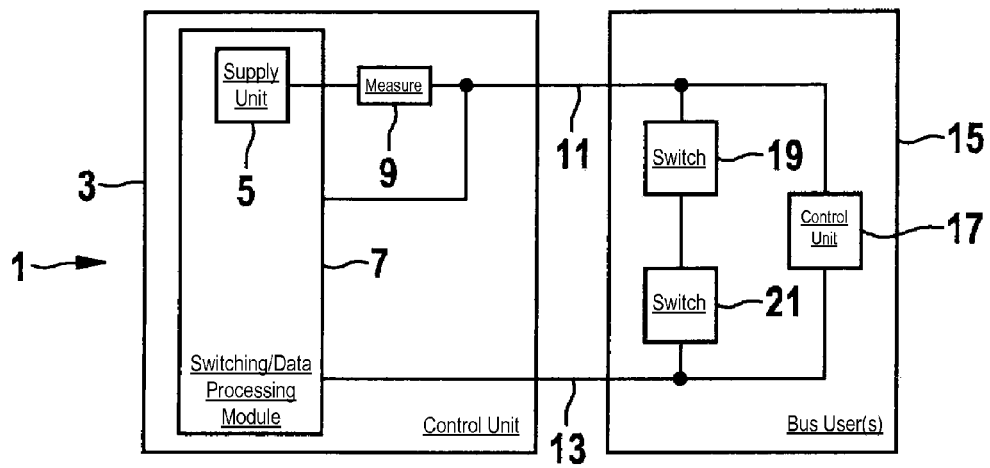
FIG. 1 shows a schematic view of a first specific embodiment of a system according to the present invention.

The exemplary embodiments and/or exemplary methods of the present invention are schematically shown on the basis of specific embodiments in the drawings and is described in greater detail hereafter with reference to the drawings.

The figures are described continuously and comprehensively; identical reference numerals identify identical components.

The first specific embodiment, which is schematically shown in FIG. 1, of a system 1 according to the present invention for carrying out a first specific embodiment of the method according to the present invention, includes a control unit 3 having a supply unit 5, which is situated in a module 7 of control unit 3, and having a measuring element 9. Mentioned module 7 is configured for switching and/or for data processing. One or more sensors or other electrical assemblies are connected as consumers to control unit 3 via two lines 11, 13 as at least one bus user 15.

A current may be modulated, e.g., via a current sink, via a control unit 17 in bus user 15 for data transmission. This modulation is carried out using switches 19, 21, which are situated inside bus user 15. The variation of the current is registered using measuring element 9 in control unit 3.

The power supply of sensors is typically carried out either via a bias current consumption of the sensors or cyclically during phases of different, typically higher voltages via charging energy storages such as capacitors, which are situated in the sensor. The cyclic transmission has the characteristic that the power phases are comparatively short in relation to the data phases.

A supply of at least one bus user 15 by control unit 3 is made possible using the specific embodiment of system 1 according to the present invention shown in FIG. 1. The at least one bus user 15 and control unit 3 are connected to one another via a network. Data are transmitted to the at least one bus user 15 during at least one phase for data transmission. Power is transmitted to the at least one bus user 15 during at least one phase for power transmission. Phases for data transmission and phases for power transmission are provided alternately and successively originating from control unit 15. The lengths of the phases are set variably, typically accompanying the operation.

Figure 2:
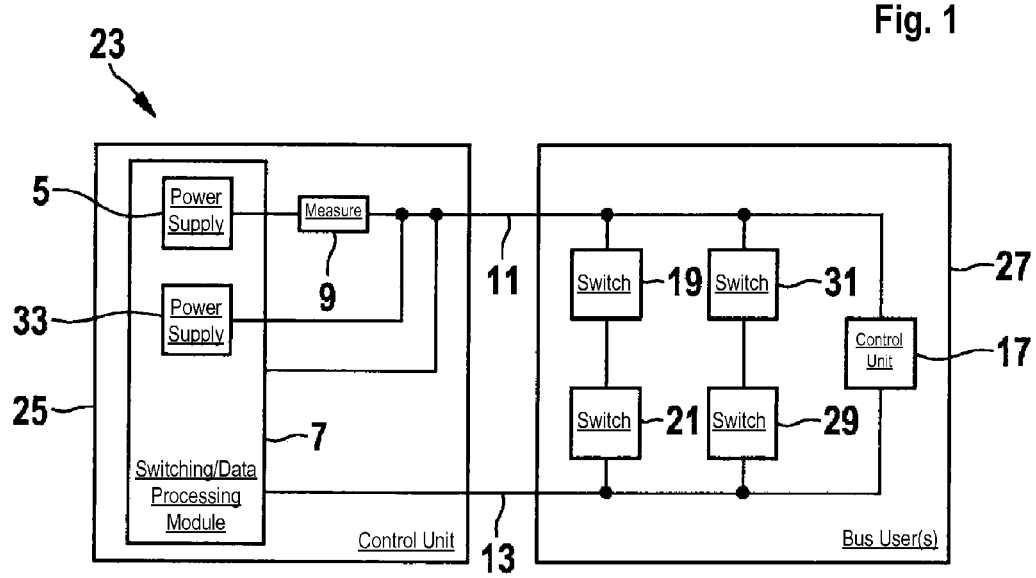
FIG. 2 shows a schematic view of a second specific embodiment of a system according to the present invention.

The second specific embodiment, which is schematically shown in FIG. 2, of a system 23 according to the present invention having a control unit 25 is also configured to carry out a specific embodiment of the method according to the present invention. It is provided in this case that in at least one bus user 27, in addition to switches 19, 21 for current modulation and data transmission, further consumers 29 having associated switch elements 31 are situated. These consumers are supplied with higher currents, e.g., from several hundred milliamperes to several amperes, in the phases of typically higher power transmission directly from supply unit 5 as the power source.

Figure 3:
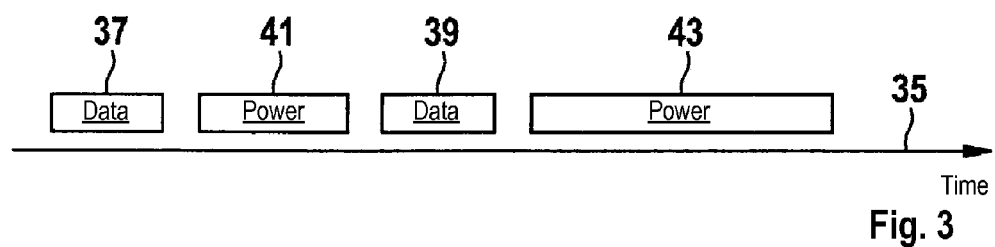
FIG. 3 shows a diagram of a sequence of a specific embodiment of the method according to the present invention.

The diagram shown in FIG. 3 for a specific embodiment of the method according to the present invention includes a time axis 35. A sequence of phases 37, 39 for data transmission "K," which may also be referred to as communication phases, and phases 41, 43 for power transmission "E" are shown along time axis 35. In the specific embodiment of the method according to the present invention, phases 41, 43 for transmitting typically larger quantities of power "E," e.g., for supplying power parts, and phases 37, 39 for data transmission "K" are separated with respect to time. In addition, the lengths of phases 37, 39 for data transmission and/or the lengths of phases 41, 43 for power transmission may be flexibly adapted to a quantity of the data to be transmitted and/or a power demand of the at least one connected bus user 15, 27. In addition, it is possible during phases 41, 43 for data transmission to additionally transmit small quantities of power, for example, to activate a sensor and/or control electronics. Power is typically transmitted to the at least one bus user 15, 27 from control unit 3, 25 (FIGS. 1 and 2). During a phase 37, 39 for data transmission "K", data and/or signals may also be mutually exchanged between control unit 3, 25 (FIGS. 1 and 2) and the at least one bus user 15, 27 (FIGS. 1 and 2).

Furthermore, phases 41, 43 for power transmission "E" may also be substantially longer than phases 37, 39 for data transmission "K." Control unit 3, 25 (FIGS. 1 and 2) is configured for this purpose in such a way that supply unit 5 (FIGS. 1 and 2) may provide greater quantities of power, for example, currents, to the at least one bus user 15, 27 (FIGS. 1 and 2). Optionally, the power to be transmitted may be transmitted via a further power supply unit 33 as a component of control unit 3, 25 to the at least one bus user 15, 27. In one design, additional power supply unit 33 may provide the required current to the at least one connected bus user 15, 27 or consumer directly, i.e., while bypassing measuring element 9.

The at least one bus user 27 is connected during phases 41, 43 for power transmission "E" via control unit 17, which has control electronics. It is possible for this purpose that control unit 17, during a phase 41, 43 for power transmission "E", registers a signal applied to lines 11, 13, for example, via a higher voltage, and/or a carrier signal, e.g., a frequency, and/or via fixed or variable time information. Such signals may be transmitted during a phase 37, 39 for data transmission "K" from control unit 3, 25 to the at least one bus user 15, 27. Such a signal may have a synchronization signal and/or a time specification in the form of a numeric value for this purpose.

In one embodiment of the present invention, the lengths of phases 41, 43 for power transmission "E" and/or phases 37, 39 for data transmission "K" are configured variably with respect to time and therefore for the typically mutual communication between the at least one connected bus user 15, 27 and control unit 3, 25. The lengths of phases 37, 39 for data transmission and/or phases 41, 43 for power transmission may be flexibly and/or dynamically adapted to a quantity of the data to be transmitted and/or to a demand for power of the at least one bus user 15, 27.

Thus, for example, in sensor/actuator combinations having multiple bus users 15, 27, the lengths of phases 41, 43 for power transmission may be configured flexibly, so that the at least one bus user 15, 27 may execute and complete one action. It is also possible that a final control element, for example, which may be configured as an electric motor and interacts with at least one bus user 15, 27, may approach a provided position in the provided time to execute the action. The action may be an electrical and/or mechanical operating step of the at least one bus user 15, 27. Subsequently, feedback may be provided via a bus user 15, 27 configured as a sensor during a communication phase and therefore in a phase 37, 39 for data transmission "K."

In a further design, control unit 3, 25 may have a dynamic interface, e.g., a distributed sensor interface (DSI), via which control unit 3, 25 may switch back and forth flexibly between phases 41, 43 for power transmission "E" and phases 37, 39 for data transmission "K."

What is claimed is:

1. A method for supplying at least one bus user via a control unit, the method comprising:
    transmitting data to the at least one bus user during at least one phase for data transmission; and
    transmitting power during at least one phase for power transmission, the at least one phase for data transmission and the at least one phase for power transmission being provided alternately;
    wherein at least one of a length of the phase for data transmission and a length of the phase for power transmission is set variably,
    wherein a control unit having a dynamic interface is used to switch over between the at least one phase for power transmission and the at least one phase for data transmission, and
    wherein at least one of the length of the phase for data transmission and the length of the phase for power transmission are at least one of flexibly adapted and dynamically adapted to at least one of a quantity of the data to be transmitted and to a demand for power of the at least one bus user, wherein power is provided at a first high output during the at least one phase for power transmission, and wherein power is provided at a second, lower output, in addition to the data, during the at least one phase for data transmission.

2. The method of claim 1, wherein the at least one bus user is connected to a network when at least one signal is present, which is transmitted during at least one phase for power transmission, and wherein the at least one signal is configured as at least one of a synchronization signal and a time specification signal.

3. The method of claim 1, wherein the phases for data transmission and the phases for power transmission are decoupled.

4. The method of claim 1, wherein a length of the at least one phase for power transmission lasts until an action is completed by the at least one bus user.

5. The method of claim 1, wherein a bus user configured as a sensor is supplied with data and power.

6. The method of claim 1, wherein the dynamic interface is a distributed sensor interface.

7. The method of claim 1, wherein a switchover pause is provided between the at least one phase for data transmission and the at least one phase for power transmission.

8. The method of claim 1, wherein the at least one bus user is connected to a network when at least one signal is present, which is transmitted during at least one phase for power transmission, and wherein the at least one signal is configured as at least one of a synchronization signal and a time specification signal.

9. The method of claim 8, wherein the phases for data transmission and the phases for power transmission are decoupled.

10. The method of claim 8, wherein a length of the at least one phase for power transmission lasts until an action is completed by the at least one bus user.

11. The method of claim 8, wherein a bus user configured as a sensor is supplied with data and power.

12. The method of claim 8, wherein the dynamic interface is a distributed sensor interface, and wherein a switchover pause is provided between the at least one phase for data transmission and the at least one phase for power transmission.

13. A system, comprising:
    a control unit to supply at least one bus user, wherein the control unit is configured to transmit data to the at least one bus user during at least one phase for data transmission and to transmit power during at least one phase for power transmission, and to alternately provide the at least one phase for data transmission and the at least one phase for power transmission, and to variably set at least one of lengths of the phases for data transmission and lengths of the phases for power transmission;
    wherein the control unit includes a dynamic interface which is used to switch over between the at least one phase for power transmission and the at least one phase for data transmission, and
    wherein at least one of the length of the phase for data transmission and the length of the phase for power transmission are at least one of flexibly adapted and dynamically adapted to at least one of a quantity of the data to be transmitted and to a demand for power of the at least one bus user, wherein power is provided at a first high output during the at least one phase for power transmission, and wherein power is provided at a second, lower output, in addition to the data, during the at least one phase for data transmission.

14. The system of claim 13, further comprising:
    at least one pair of lines, via which the at least one bus user is connected to the control unit.

15. The system of claim 13, wherein the dynamic interface is a distributed sensor interface.

16. The system of claim 13, wherein a switchover pause is provided between the at least one phase for data transmission and the at least one phase for power transmission.

17. The system of claim 13, wherein the at least one bus user is connected to a network when at least one signal is present, which is transmitted during at least one phase for power transmission, and wherein the at least one signal is configured as at least one of a synchronization signal and a time specification signal.

18. The system of claim 13, wherein the phases for data transmission and the phases for power transmission are decoupled.

19. The system of claim 13, wherein a length of the at least one phase for power transmission lasts until an action is completed by the at least one bus user.

20. The system of claim 13, wherein a bus user configured as a sensor is supplied with data and power.

21. The system of claim 13, wherein the dynamic interface is a distributed sensor interface, and wherein a switchover pause is provided between the at least one phase for data transmission and the at least one phase for power transmission.

* * * * *